2,991,149
METHOD OF DEHYDRATING HYDRATES OF THORIUM FLUORIDE

James P. Flynn, Midland, Mich., assignor to The Dow Chemical Company, Midland, Mich., a corporation of Delaware
No Drawing. Filed Oct. 4, 1957, Ser. No. 688,137
2 Claims. (Cl. 23—14.5)

This invention relates to an improved method of dehydrating hydrates of thorium fluoride.

In the production of magnesium-thorium alloys by reduction of thorium fluoride with molten magnesium in the presence of a protective salt flux, a portion of the thorium does not become alloyed but is transformed to thorium oxide which settles with the saline metallurgical sludge normally formed. Experience has shown that the proportion of thorium fluoride which becomes alloyed is higher as the total water content, i.e., water of hydration plus adsorbed moisture, of thorium fluoride is decreased. Therefore the use of anhydrous thorium fluoride in the preparation of a magnesium thorium alloy is desirable.

However, insofar as it is known, anhydrous thorium fluoride has not been made available in commercial quantities. One reason for this situation is that while adsorbed water may be removed from thorium fluoride by oven drying at 125 to 225° C., water of hydration is much more difficult to remove. The last half molecule of water of hydration is only slowly removed by heat alone even at a temperature of 300° C.

While a number of inorganic salts are readily and reversibly dried, the behavior of the thorium fluoride hydrates is relatively complex as shown by studies reported in the literature. Asker, Segnit and Wylie (1952), J. Chem. Soc., 4470, found that small amounts of water, i.e., less than 2 percent, closely held by this salt, are removed thermally only at temperatures at which the salt gradually decomposes. After air-drying the precipitate formed by the addition of aqueous hydrofluoric acid to a thorium nitrate solution, a thorium fluoride hydrate is obtained which has a water content, variously, of 2.5 to 3.5 molecules of water per metal atom. If this hydrate is dried at 100° C. in an air oven the water content drops to the range of 1 to 2 water molecules per metal atom. D'Eye and Booth, J. Inorg. Nucl. Chem., 1, 326 (1955), report that the hydrate degrades to the anhydrous tetrafluoride when heated in air for some hours at 300° C. and that heating in vacuo prevents decomposition due to atmospheric hydrolysis. They state further that the behavior of the water in this hydrate is perhaps analogous to that in $AlF_3 \cdot 3.5H_2O$ which also loses water in stages and whose last half molecule of water is removed only at red heat. In the same journal article by D'Eye and Booth, crystallographic studies reported show that thorium fluoride in different states of hydration is known to exist in five different solid phases. The authors state that they believe that some parts of the water of hydration are bound differently so that all portions of the water of hydration are not equivalent.

To show further the unusual behaviour of thorium fluoride, D'Eye and Booth report that anhydrous thorium fluoride prepared by thermal degradation of the hydrate, did not hydrate to a degree detectable by X-ray crystallography on boiling in water for a number of hours. After a longer period of boiling, e.g., several days, samples assumed a composition approximating $ThF_4 \cdot 0.5H_2O$.

Thus, the usual method of thermally dehydrating a hydrate is not applicable to thorium fluoride hydrates except at quite elevated temperatures at which some decomposition of the salt occurs. As a consequence desirably dehydrated thorium tetrafluoride suitable for efficient reduction by magnesium is not readily obtainable.

It is an object of this invention to provide an improved method for dehydrating hydrated thorium fluoride which overcomes difficulties heretofore encountered.

It is a further object of this invention to provide a method of dehydrating the hydrates of thorium fluoride which does not require the use of a hydrogen fluoride atmosphere to prevent hydrolysis of the salt.

A still further object is to provide a method which can be used at the terminal point of any process for making hydrated thorium fluoride so that the end product is anhydrous thorium fluoride.

The present invention is based on the discovery that upon refluxing a solid hydrate of thorium fluoride with at least one-third of the molar equivalent amount of a suitable liquid mineral acid, the salt is converted to the anhydrous form as determined by X-ray analysis of the oven-dried product so obtained and separated from the so used mineral acid.

The invention then consists of the process herein described and particularly pointed out in the claims.

In carrying out the invention the dehydration of the hydrated thorium fluoride may be effected in a vessel or flask equipped with a water-cooled condenser. A sufficient volume of a diluted mineral acid, such as nitric, hydrochloric, or hydrobromic acid, to contain at least one-third mole of acid per mole of thorium fluoride hydrate to be dehydrated is added to the vessel. This acid-salt mixture is then heated to and maintained at at least 80° C. for a time sufficient for dehydration to occur.

While dehydration may be effected with acid concentrations of 0.1 molar or greater, the limitations of materials of construction would tend to put a practical upper acid concentration limit at about 6 molar. Dehydration of a thorium fluoride hydrate with acid of low concentration requires a longer heating period but produces a product of good crystallinity. On the other hand, dehydration with more concentrated acid is more rapid but results in a less crystalline, i.e., at least partially amorphous, product. A preferred acid concentration for carrying out the invention is 0.5 molar. Dehydration will occur at a temperature in the range of 80° C. to the reflux temperature of the said acid-salt mixture. A preferred reaction temperature that is readily controlled is the temperature at which the said acid-salt mixture refluxes under atmospheric pressure, i.e., 100° to 105° C. for the dilute acids mentioned above although other pressures may be used.

Under strenuous conditions of higher acid concentration, or super-atmospheric pressure, or rapid refluxing, dehydration of thorium fluoride may be complete in as short a time as 15 minutes. Under very mild conditions, i.e., sub-atmospheric pressure or below-boiling temperature, 2 hours or more may be required. Dehydration of thorium fluoride hydrate is generally completed in about half an hour under the preferred conditions of 0.5 molar acid concentration and reaction at reflux temperature under atmospheric pressure.

At the end of the heating or refluxing period the said acid-salt mixture is allowed to cool. The dehydrated fluoride is separated from the spent acid solution, as by filtration. If the mineral acid employed in the dehydration process is nitric acid, the separated dehydrated fluoride may be freed of undesirable nitrates by washing with water or, preferably, very dilute hydrochloric acid, e.g., 0.5 percent HCl, to avoid peptization. The separated, or separated and washed thorium fluoride is then suitably dried, as in an oven, at a temperature in the range of 125° to 225° C. for one to two hours, though other drying times and temperatures may be used. Preferred conditions for oven-drying are 150° C. for two hours.

Anhydrous thorium fluoride prepared according to the practice of this invention exhibits X-ray powder patterns which compare favorably with the X-ray powder pattern of a sample of anhydrous thorium fluoride especially prepared for reference use and formed by passing a stream of anhydrous hydrogen fluoride over thorium oxide.

Hydrated thorium fluoride is distinguished from anhydrous thorium fluoride in having a completely different crystal lattice. Therefore identification and comparison of the hydrated and the anhydrous forms of thorium fluoride is based on X-ray analysis rather than the weight loss on drying method which does not distinguish between water of hydration and adsorbed water. Hydrated thorium tetrafluoride having as much as 4 moles of water or more may be dehydrated by the method of the invention.

The following table shows the operating conditions and the results of a number of examples which are illustrative of the practice of this invention.

The table indicates for each example the quantity of thorium fluoride hydrate and mineral acid in reaction. The approximate molar ratio of the reactants, reaction conditions, drying conditions and the results of X-ray analysis. Examples 2 and 4 show that dehydration of a thorium fluoride hydrate may be effected in as short a period as 15 minutes using an acid concentration in the range of 0.5 to 2 molar. Examples 9, 10, 11 and 12 show that dehydration can also be carried out at a temperature as low as 80° C. using an acid concentration in the range of 0.5 to 2 molar.

What is claimed is:

1. In a method of dehydrating a previously separated hydrate of thorium fluoride the step which consists in heating at a temperature of at least 80° C. the hydrate of thorium fluoride in contact with an aqueous solution of hydrochloric acid having a concentration of at least 0.1 molar, for a time sufficient to dehydrate the said fluoride.

2. In a method of dehydrating a previously separated hydrate of thorium fluoride the step which consists in heating at a temperature of at least 80° C. the hydrate of thorium fluoride in contact with an aqueous solution of hydrobromic acid having a concentration of at least 0.1 molar, for a time sufficient to dehydrate the said fluoride.

| Example No. | $ThF_4 \cdot xH_2O$,[1] grams | Acid Solution | | | Approx. acid-salt molar ratio | Reaction conditions | | Drying conditions | | Results of X-ray analysis |
|---|---|---|---|---|---|---|---|---|---|---|
| | | Acid | Molar conc. | Volume, ml. | | Temp., ° C. | Hours | Temp., ° C. | Hours | |
| 1 | 50 | $HNO_3$ | 0.5 | 200 | 2:3 | reflux, atm. press. | 4.5 | 125 | 22 | Anhydrous $ThF_4$. |
| 2 | 50 | HCl | 0.5 | 200 | 2:3 | do | 0.25 | 130 | 10 | Do. |
| 3 | 50 | HCl | 0.5 | 100 | 1:3 | do | 1.5 | 130 | 10 | Do. |
| 4 | 50 | HCl | 2 | 200 | 3:1 | do | 0.25 | 130 | 10 | Do. |
| 5 | 15 | HCl | 0.1 | 460 | 1:1 | do | 1 | 130 | 10 | Do. |
| 6 | 15 | HCl | 0.1 | 460 | 1:1 | do | 3 | 130 | 10 | Do. |
| 7 | 25 | HCl | 0.3 | 255 | 1:1 | do | 1 | 130 | 10 | Do. |
| 8 | 25 | HCl | 0.3 | 255 | 1:1 | do | 3 | 130 | 10 | Do. |
| 9 | 50 | HCl | 0.5 | 200 | 2:3 | 80° C | 1.5 | 130 | 10 | Do. |
| 10 | 50 | HCl | 0.5 | 200 | 2:3 | 80° C | 3 | 130 | 10 | Do. |
| 11 | 50 | HCl | 2 | 200 | 3:1 | 80° C | 0.25 | 130 | 10 | Do. |
| 12 | 50 | HCl | 2 | 200 | 3:1 | 80° C | 2 | 130 | 10 | Do. |

[1] $x$ varied slightly but was usually about 1 to 1.

References Cited in the file of this patent

UNITED STATES PATENTS 2,784,059   McCaulay _____ Mar. 5, 1957

FOREIGN PATENTS 328,688   Great Britain _____ May 5, 1930

OTHER REFERENCES

AEC Document AECD-3705, July 1954 (date declassified Nov. 29, 1955), pp. 7-11. (Copy in Scientific Library.)

AEC Document KLX-1226, June 25, 1952, 40 pages. (Copy may be obtained from the Atomic Energy Commission Library.)